Oct. 16, 1956
E. P. O. BOOTH
2,766,629
VIBRATING SCREEN MECHANISM WITH RESILIENT CONNECTION
BETWEEN GEAR AND COUNTERWEIGHT
Filed May 24, 1954
2 Sheets-Sheet 1
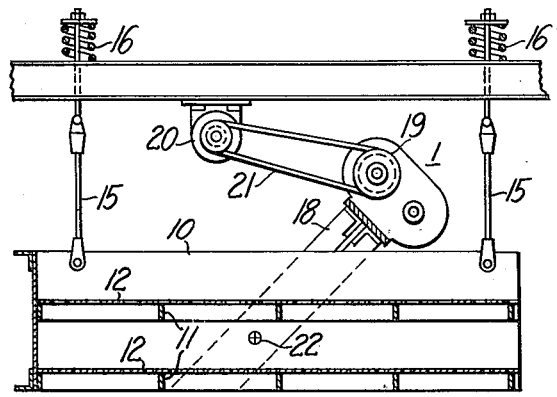
Fig. 1
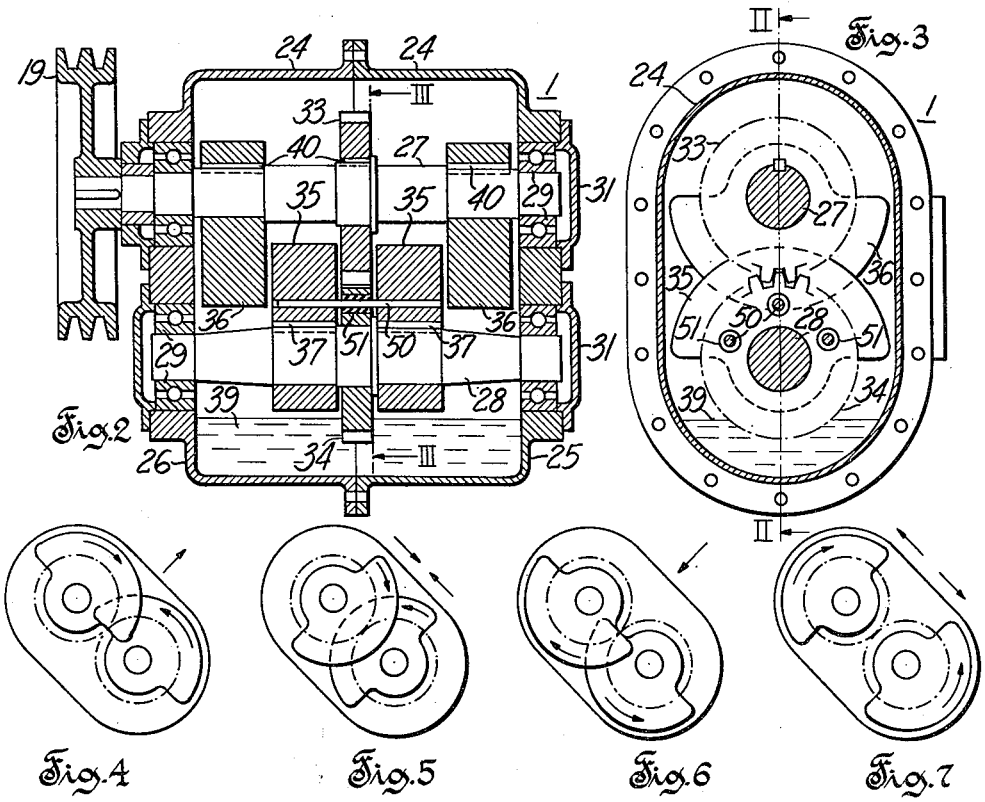
Fig. 2    Fig. 3
Fig. 4    Fig. 5    Fig. 6    Fig. 7
Inventor
Edmond P. O. Booth
By Wayne C. Easton
Attorney Oct. 16, 1956 E. P. O. BOOTH 2,766,629
VIBRATING SCREEN MECHANISM WITH RESILIENT CONNECTION
BETWEEN GEAR AND COUNTERWEIGHT
Filed May 24, 1954 2 Sheets-Sheet 2

Inventor
Edmond P. O. Booth
by Wayne P. Easton
Attorney

United States Patent Office 2,766,629
Patented Oct. 16, 1956

2,766,629

VIBRATING SCREEN MECHANISM WITH RESILIENT CONNECTION BETWEEN GEAR AND COUNTERWEIGHT

Edmond P. O. Booth, Johannesburg, Transvaal, Union of South Africa, assignor to Allis-Chalmers Manufacturing Company, Milwaukee, Wis.

Application May 24, 1954, Serial No. 431,926

4 Claims. (Cl. 74—61)

This invention relates to vibrating screens and particularly to an improvement in mechanisms therefor of the type which impart a straight line motion or an elongated elliptical motion to the vibrating screen body to which the mechanism is attached. Vibrating screen mechanisms of this type are referred to generally as straight line vibrating mechanisms.

A vibrating screen mechanism of the type referred to herein is disclosed in detail in a patent to C. S. Lincoln et al., U. S. 2,144,382. A mechanism of this type comprises, generally, a housing or frame adapted to be connected to a screen body, two parallel shafts mounted in the housing and geared to rotate in opposite directions, a pair of gears mounted respectively on the shafts in meshing relation, eccentrically positioned counterweights rigidly connected to the shafts, and power transmission means such as a pulley connected to one of the shafts for driving the mechanism. Rotation of one of the shafts causes the respective weights mounted on the two shafts to rotate in unison in opposite directions such that a reciprocatory motion is imparted to the screen body. If it is desired to impart an elliptical motion to a screen body the weights are connected to the shafts in nonsymmetrical relation to each other, or the counterweights are attached at different radial positions from the respective shafts, or the counterweights may be given different masses relative to each other.

The present inventor has observed that certain difficulties are encountered with mechanisms of this type which have to do with excessive wear to the gear teeth and noisiness of the mechanism in operation.

One possible cause for these difficulties appears to be due to the backlash of the gear teeth. The gear teeth must necessarily be provided with backlash in accordance with standard practice so that a clearance between meshing teeth is provided to avoid binding. The presence of the backlash therefore means that there is "play" between the gears. This "play" between the gears is of significance in straight line type mechanisms for the reason that in such mechanisms the speeds of the gears relative to each other apparently vary constantly. The result is that the leading sides of the teeth on the driving gear lose contact with the trailing sides of the teeth on the driven gear such that the trailing sides of the teeth on the driving gear make a jarring contact with the leading sides of the teeth on the driven gear, and vice versa. An explanation of this is that in a straight line type mechanism the weights on each of the shafts travel in an elliptical path and twice during each cycle of operation the weights accelerate momentarily and then decelerate. Consequently the gears connected to the shafts are caused to accelerate momentarily and then decelerate. The speed of the driving gear is more constant than the driven gear, however, for the reason that it is connected through a pulley and a belt to an electric motor which resists the tendency of the driving gear to accelerate and decelerate. In effect, therefore, the driven gear alternately tends to rotate both faster and slower than the driving gear twice during each cycle of operation such that the teeth of the driving gear alternately lose contact and make contact with the teeth of the driven gear. This results in a jarring contact between the teeth of the gears twice during each cycle of operation which results in excessive wear to the gear teeth and undesirable noisiness.

The above stated cause of excessive wear to the gear teeth and noisiness is substantiated by noting a periodic hammering or rattling noise during operation of the mechanism which indicates that the periodic accelerating and decelerating of the weights and gears cause a periodic jarring contact between the gear teeth. It is also substantiated by observing that only a few of the teeth of the gears are subjected to excessive wear and only a few of the teeth show signs of impact on both the leading and trailing sides thereof.

Another possible cause of the excessive wear to the gear teeth and the noisiness involved in the operation of a straight line type mechanism appears to involve the clearance which necessarily must be provided between the shafts and the bearings in the housing and also the fact that the rotation of the weights causes bending of the shafts. The eccentrically disposed weights on the shafts alternately move toward and away from each other and, consequently, the gears themselves alternately move radially toward and away from each other because of the clearances in the bearings and also because the unbalanced weights cause the shafts to deflect toward and away from each other.

Regardless of the real or theoretical causes of the excessive wear to the gear teeth incurred and the noisiness involved during operation of the mechanism, however, the improvement of such mechanisms disclosed and claimed herein substantially minimizes such difficulties. In general such improvement lies in providing a resilient connection between at least one of the gears, which may be either the driving or driven gear, and the eccentrically disposed weights mounted on the same shaft therewith. With such construction the mating gears do not lose contact with each other during operation of the mechanism and any shock that would otherwise occur when the gears are caused to move radially toward and away from each other as described above is materially reduced.

It is accordingly a main object of the invention to provide a new and improved straight line type actuating mechanism for vibrating screens in which excessive wear to the gear teeth and noisiness involved in operation is minimized.

Another object of the invention is to provide an improved straight line type mechanism in which the gear teeth on one of the gears are caused to maintain contact with the teeth on the mating gear with which it meshes during operation of the mechanism.

Another object of the invention is to provide an improved straight line type mechanism in which means are provided for absorbing shocks caused during operation of the mechanism due to the clearance between the gear shaft and the bearings of the mechanism housing, and due to deflections of the shafts caused by rotation of the respective unbalanced weights mounted on the shafts.

Other objects and advantages will appear from a detailed description of the invention, two embodiments of which are described below and illustrated in the accompanying drawing.

In the drawing:

Fig. 1 is a sectional elevation of a vibrating screen equipped with a straight line actuating mechanism of the type to which the present invention is directed;

Fig. 2 is a sectional view of the improved actuating mechanism taken on line II—II of Fig. 3;

Fig. 3 is a sectional view of the improved actuating mechanism taken on line III—III of Fig. 2;

Figs. 4, 5, 6 and 7 are diagrammatic views of the actuating mechanism in four successive positions;

Figure 8:
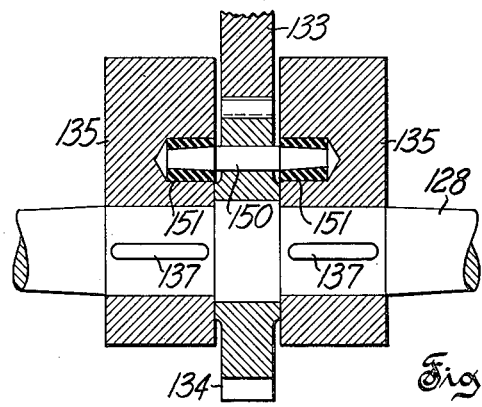
Figs. 8 and 9 are fragmentary sectional views similar to a portion of the view of Fig. 2 showing, respectively, two modifications of the improved actuating mechanism.

Referring to Fig. 1, a straight line type mechanism 1 of the type to which the present invention pertains is shown in a vibrating screen assembly. The vibrating screen illustrated comprises a screen body having side plates 10 and transverse supporting members 11, and having one or more screen cloths 12. The screen is suspended by four cables 15 which are attached to an overhead support through helical springs 16.

The mechanism 1 is mounted rigidly on the screen body by means of a support 18 and is provided with a power transmission member or pulley 19 through which it may be operated. A motor 20 mounted on a stationary support is utilized to drive the mechanism 1 through one or more V-belts 21. The support 18 is mounted in line with the force exerted by the actuating mechanism 1. The angle between the screen cloth and the direction of force exerted by the mechanism 1 may have any suitable value, such as 45° as illustrated. The support 18, which serves not only to support the weight of the mechanism 1 but also serves to transmit the vibrating force to the screen body, has the longitudinal center line thereof passing substantially through the center of gravity of the screen, indicated by the numeral 22, so that all parts of the screen are reciprocated equally.

The construction of the mechanism 1 is best shown in Figs. 2 and 3. A housing or frame of generally cylindrical form is provided which comprises a casing 24 having walls 25 and 26 which carry parallel shafts 27 and 28 in bearings 29. One end of shaft 27 extends through the housing and carries pulley 19 fixed thereon. Bearing covers 31 and appropriate packing at the pulley end of shaft 27 serve to seal the housing so that it may contain oil for lubricating the bearings 29. Gears 33 and 34 are mounted centrally of shafts 27 and 28, respectively, for mutual engagement, whereby the rotation of pulley 19 serves to rotate shafts 27 and 28 in opposite directions.

Mounted symmetrically on opposite sides of gear 34 are two eccentric positioned weights or masses 35. Another pair of eccentric weights 36 are mounted on shaft 27 symmetrically with respect to gear 33. The weights 35 and 36 are spaced axially on their respective shafts so as not to interfere with each other during operation of the actuating mechanism. Rotation of pulley 19 causes shafts 27 and 28 and their weights to rotate in opposite directions and the weights 35 and 36 are so fixed on their respective shafts that the resultant of the centrifugal force caused by their rotation is along a line which is perpendicular to the plane passing through the axes of the shafts.

The operation of the actuating mechanism 1 to produce rectilinear vibrations is illustrated in Figs. 4 to 7 which show diagrammatically the location of the eccentrically positioned weights at four successive positions 90° apart during rotation of the shafts. Fig. 3 shows at 39 the level of the oil contained in the sealed casing. It will be seen that as the shaft 28 rotates, the weights attached thereto dip into the oil and distribute it, and serve to lubricate all four bearings 39.

The structure of actuating mechanism 1 described thus far is conventional for this type of mechanism and the improvement thereto will be described hereinafter.

It is an essential structural feature of the invention that at least one of the two gears be resiliently mounted relative to the eccentrically disposed weights mounted on the same shaft therewith to allow relative rotational movement between such gear and weights.

An operable arrangement for providing such a resilient connection between one of the gears 34 and weights 35, which allows a relative rotational movement between the gear and weights, is illustrated in Figs. 2 and 3. Driven gear 34 is freely mounted on driven shaft 28 and the resilient connection is provided between gear 34 and eccentrically positioned weights 35 which are rigidly connected to shaft 28 as with a keying arrangement 37. Gear 33 and weights 36 may be rigidly connected to shaft 27 as with a keying arrangement 40. One or more pins 50 are provided which are positioned eccentrically relative to shaft 28 and which extend transversely through weights 35 and gear 34. Appropriate bores are provided in weights 35 to permit pins 50 to be rigidly attached to the weights and an enlarged bore is provided in gear 34 to accommodate bushings 51, which are made of rubber or a similar resilient material, between pins 50 and gear 34. It is seen that relative rotational movement between gear 34 and weights 35 could also be obtained by providing a direct resilient connection between gear 34 and shaft 28.

A generally equivalent construction is shown in Fig. 8 in which the parts for the resilient connection are reversed. In this construction bushings 151 of a resilient material are disposed in weights 135, and pins 150 are rigidly connected to driven gear 134. Driven gear 134 engages driving gear 133. Gear 134 is freely mounted on shaft 128 and weights 135 are rigidly connected to shaft 128 as with keying arrangement 137 in the same manner as in the construction shown in Figs. 2 and 3.

Figure 9:
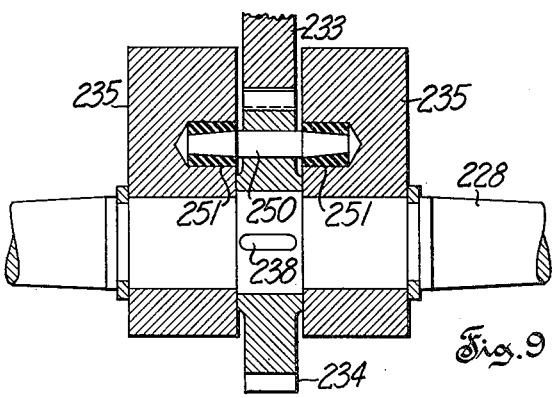

Another embodiment of the invention in which the driven gear is in effect mounted resiliently relative to the weights disposed on the same shaft therewith is illustrated in Fig. 9. The construction is similar to the construction shown in Fig. 8 except that the driven gear 234, which engages driving gear 233, is fixedly mounted on shaft 228 as with a keying arrangement 238 and weights 235 are freely mounted on shaft 228. The resilient connection between gear 234 and weights 235, which permits relative rotational movement therebetween, comprises bushing 251 of a resilient material disposed in weights 235 and cooperating pins 250 which are rigidly connected to shaft 228.

It has been found, as explained in the introduction of this specification, that the improvement in straight line type actuating mechanisms described above has resulted in minimizing wear to the gear teeth and reducing the noisiness involved in operating the mechanism. In general the resilient connection which provides for relative rotational movement between the driven gear and the eccentrically disposed weights mounted on the same shaft therewith permits "lost motion" between the gear and the weights. When the driven weight accelerates, as it does twice during each cycle of operation, it must first make up "lost motion" before it can transmit a rotational force to the driven gear to which it is resiliently attached. Before the "lost motion" is made up, however, the weights on the driven shaft start to decelerate and consequently such weights are never given the opportunity to transmit a rotational force to the driven gear. If the weights on the driven shaft were rigidly connected to the driven gear, the acceleration of the weights on the driven shaft would immediately cause the driven gear to accelerate and consequently lose contact with the driving gear.

Figure 10:
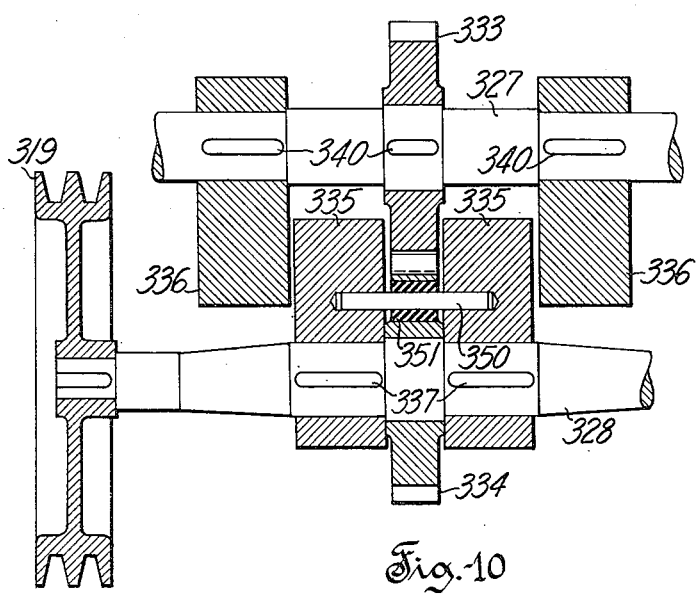
Fig. 10 is a longitudinal sectional view similar to Fig. 2 showing a fourth modification of the invention.

Another embodiment of the invention which involves providing a resilient connection between the driving gear and the weights mounted on the same shaft therewith is illustrated in Fig. 10. The construction shown in Fig. 10 is similar to the construction shown in Figs. 2 and 3 except that the driving pulley 319 is mounted on the opposite shaft. In this construction the relative rotational movement is obtained between the driving gear, as distinguished from the driven gear, and the weights mounted on the same shaft therewith. In this embodiment the driving gear 334 is freely mounted on shaft 328 and weights 335 are rigidly connected to shaft 328 as with a keying arrangement 337. Driven gear 333 and weights 336 may be rigidly connected to shaft 327 as with a keying arrangement 340. A resilient connection similar to that shown in the embodiment of Figs. 2 and 3 is illustrated for allowing relative rotation between driving gear 334 and weights 335. In the operation of this embodiment the resistance offered by driven gear 333 causes the resiliently mounted driving gear 334 to rotate slightly relative to weights 335 and thus lag behind weights 335. When weights 336 accelerate, as they do twice during each cycle of operation, as explained above, driven gear 333, which is attached rigidly to weights 336 through shaft 327, also accelerates and the teeth of gear 333 tend to move away from the teeth of driving gear 334. This tendency of driven gear 333 to move away from driving gear 334 has the effect of decreasing the resistance offered by driven gear 333. It is this resistance which causes driving gear 334 to lag behind weights 335, however, and, upon such resistance being reduced, driving gear 334 is also caused to accelerate such that the teeth thereof continue to maintain contact with the teeth of driven gear 333. When weight 336 decelerates, driven gear 333 also decelerates and thus offers increased resistance to driving gear 334 such that driving gear 334 is again caused to lag behind weights 335. The cycle described is repeated twice during each revolution of pulley 319 because weights 336 on driven shaft 327 alternately accelerate and decelerate twice during each revolution of pulley 319.

While four specific embodiments of the invention have been described for purposes of illustration, it is to be understood that the invention is not to be restricted to the exact details shown and described since other modifications within the scope of the claims will occur to persons skilled in the art to which this invention pertains. Obviously there are numerous ways from a structural standpoint, for example, that either the driven gear or driving gear may be resiliently mounted relative to the weights mounted on the same shaft therewith so as to provide for relative rotational movement between the gear and weights. Moreover, the actuating mechanism may be used to vibrate apparatus other than screens, such as sieves, hoppers, sifters, tappers, packing and tamping apparatus, etc. and is especially applicable to feeders and conveyors of the reciprocated type.

It is claimed and desired to secure by Letters Patent:

1. In a vibrating mechanism, a vibratable frame provided with bearings, first and second parallel shafts rotatably mounted in said bearings, a power transmission driving member attached to said first shaft, two gears mounted on said shafts in meshing relation with one gear being freely mounted on said second shaft, eccentrically positioned weight means mounted on each of said shafts for rotation therewith with the weight means on said second shaft being rigidly attached thereto, and resilient means operably connecting the gear and weight means on said second shaft to permit relative rotation therebetween, said resilient means comprising eccentrically disposed pinning means rigidly connected to the weight means on said second shaft and extending transversely thereof and resilient bushing means disposed in said gear on said second shaft for receiving said transversely extending pinning means in force transmitting relation.

2. In a vibrating mechanism, a vibratable frame provided with bearings, first and second parallel shafts rotatably mounted in said bearings, a power transmission driving member attached to said first shaft, two gears mounted on said shafts in meshing relation with one gear being freely mounted on said second shaft, eccentrically positioned weight means mounted on each of said shafts for rotation therewith with the weight means on said second shaft being rigidly attached thereto, and resilient means operably connecting the gear and weight means on said second shaft to permit relative rotation therebetween, said resilient means comprising eccentrically disposed pinning means rigidly connected to the gear on said second shaft and extending transversely thereof and resilient bushing means disposed in said weight means on said second shaft for receiving said transversely extending pinning means in force transmitting relation.

3. In a vibrating mechanism, a vibratable frame provided with bearings, first and second parallel shafts rotatably mounted in said bearings, a power transmission driving member attached to said first shaft, two gears mounted on said shafts in meshing relation with one gear being fixedly connected to the second shaft, eccentrically positioned weight means mounted on each of said shafts for rotation therewith with the weight means for said second shaft being freely mounted thereon, and resilient means operably connecting the gear and weight means on said second shaft to permit relative rotation therebetween, said resilient means comprising eccentrically disposed pinning means rigidly connected to the gear on said second shaft and extending transversely thereof and resilient bushing means disposed in said weight means on said second shaft for receiving said transversely extending pinning means in force transmitting relation.

4. In a vibrating mechanism, a vibratable frame provided with bearings, first and second parallel shafts rotatably mounted in said bearings, a power transmission driving member attached to said first shaft, two gears mounted on said shafts in meshing relation with one gear being freely mounted on said first shaft, eccentrically positioned weight means mounted on each of said shafts for rotation therewith with the weight means on said first shaft being rigidly attached thereto, and resilient means operably connecting the gear and weight means on said first shaft in variable rotary movement transmitting relation, said resilient means comprising eccentrically disposed pinning means rigidly connected to the weight means on said first shaft and extending transversely thereof and resilient bushing means disposed in said gear on said first shaft for receiving said transversely extending means in force transmitting relation.

References Cited in the file of this patent

UNITED STATES PATENTS

| | | |
|---|---|---|
| 1,797,840 | Schieferstein | Mar. 24, 1931 |
| 1,974,514 | Schieferstein | Sept. 25, 1934 |
| 1,994,705 | Hill | Mar. 19, 1935 |
| 2,144,382 | Lincoln | Jan. 17, 1939 |
| 2,545,245 | Stutz | Mar. 13, 1951 |